(12) United States Patent
Zenner et al.

(10) Patent No.: US 7,759,417 B2
(45) Date of Patent: Jul. 20, 2010

(54) STABILIZER COMPOSITIONS

(75) Inventors: John Mathew Zenner, Lakeville, MN (US); Brent Sanders, Battle Ground, IN (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/300,686

(22) PCT Filed: May 10, 2007

(86) PCT No.: PCT/US2007/011342

§ 371 (c)(1),
(2), (4) Date: Dec. 16, 2008

(87) PCT Pub. No.: WO2007/136565

PCT Pub. Date: Nov. 29, 2007

(65) Prior Publication Data

US 2009/0149581 A1    Jun. 11, 2009

Related U.S. Application Data

(60) Provisional application No. 60/747,459, filed on May 17, 2006.

(51) Int. Cl.
   *C08K 5/49*    (2006.01)
   *C08K 5/34*    (2006.01)

(52) U.S. Cl. .................... 524/117; 524/100
(58) Field of Classification Search ........... 524/117
   See application file for complete search history.

(56) References Cited

U.S. PATENT DOCUMENTS

| | | | |
|---|---|---|---|
| 3,215,707 A | 11/1965 | Rense | 260/326.3 |
| 3,218,294 A | 11/1965 | Rodgers et al. | 260/45.75 |
| 6,613,823 B1 * | 9/2003 | Battiste et al. | 524/127 |
| 6,664,317 B2 * | 12/2003 | King, III | 524/99 |
| 6,770,693 B2 | 8/2004 | Stein et al. | 524/128 |
| 6,843,939 B2 * | 1/2005 | Stretanski et al. | 252/405 |
| 2005/0113494 A1 | 5/2005 | Bobsein et al. | 524/115 |

FOREIGN PATENT DOCUMENTS

| WO | WO 03/099918 A1 | 12/2003 |
|---|---|---|
| WO | WO 2004/031282 A1 | 4/2004 |

* cited by examiner

*Primary Examiner*—Ling-Siu Choi
*Assistant Examiner*—Hui Chin
(74) *Attorney, Agent, or Firm*—Charles E. Bell

(57) ABSTRACT

Stabilizer compositions comprise phosphate of the formula (I) or (II), a phosphite of the formula (III), and a phenol of the formula (IV) as these formulas are defined herein. The stabilizer compositions are useful for stabilizing polymers. Methods for making stabilized polymer compositions involve intermixing the stabilizer compositions and the polymers, e.g., by extruding, pelletizing, and/or molding.

34 Claims, No Drawings

STABILIZER COMPOSITIONS

CROSS-REFERENCE TO RELATED APPLICATIONS

This application is the U.S. National Phase application of International Application No. PCT/US2007/011342, filed May 10, 2007 and published as WO 2007/136565, which claims priority to U.S. Provisional Application No. 60/747,459, filed May 17, 2006, which is incorporated by reference herein in its entirety.

BACKGROUND OF THE INVENTION

1. Field of the Invention

This invention relates to blends of phosphites and phenols and the use of such blends as stabilizers for polymers.

2. Description of the Related Art

A wide range of stabilizers are added to polymers to reduce the detrimental effects of various environments on polymer properties. The stabilizers may be added to the polymers to stabilize them against various sources of degradation such as heat, light, oxygen, mechanical stress and the presence of impurities, any or all of which may be encountered during polymer preparation, storage, shipping, fabrication into useful articles and/or during the ultimate use of those articles. Many polymer degradation pathways are believed to result from the presence of free radicals created in the polymers by, e.g., exposure to heat, ultraviolet radiation, mechanical shear, and/or impurities. It is believed that when a free radical is formed, abstraction of a hydrogen atom from the polymer can initiate a chain reaction that results in polymer oxidation. Subsequent reaction of the radical with an oxygen molecule can yield a peroxy radical, which then can react with an available hydrogen atom to form an unstable hydroperoxide and another free radical. In the absence of polymer stabilizers, these reactions can become self-propagating and can lead to polymer degradation and undesirable reduction in properties.

Antioxidants are polymer additives that are used to reduce oxidative degradation of polymers. Phenolic antioxidants are a commercially significant class of antioxidants in which the phenolic hydroxyl group is flanked by alkyl or arylalkyl groups. The flanking groups provide steric hindrance around the oxygen atom, thereby influencing the performance of the antioxidant. Greater steric hindrance has generally been associated with greater antioxidant activity, and thus in a number of commercially significant phenolic antioxidants the phenolic hydroxyl group is flanked on both sides by relatively large groups. For example, phenolic antioxidants have traditionally been based on structures similar to 2,6-di-t-butyl-4-methylphenol (BHT), in which t-butyl groups symmetrically flank the phenolic hydroxyl group.

Phosphite antioxidants are another commercially significant class of antioxidants. Examples include (bis-(2,4-dicumylphenyl)pentaerythritol diphosphite (DOVERPHOS® S-9228) and tris-(2,4-di-t-butylphenyl)phosphite (IRGANOX® 168). A blend containing 64.1% CYASORB® UV-3529 (1,6-hexanediamine,N,N'-bis(1,2,2,6,6-pentamethyl)-4-piperidinyl)-, polymers with 2,4-dichloro-6-(4-morpholinyl)-1,3,5-triazine), 7.7% CYANOX® 1790 (1,3,5-tris (4-t-butyl-3-hydroxy-2,6-dimethyl benzyl)-1,3,5-triazine-2,4,6-(1H,3H,5H)-trione), 14.5% IRGAPHOS® 168 (tris-(2,4-di-t-butylphenyl)phosphite), 7.7% ULTRANOX® 626 (bis-(2,4-di-t-butylphenyl)pentaerythritol diphosphite) and 5.1% KADOX® 911 (Zinc Oxide) was apparently sold commercially in 2002. The DOVERPHOS® S-9228, IRGANOX® 168 and ULTRANOX® 626 products are generally considered to be non-symmetrically hindered because the groups flanking the oxygen atom that is attached to the aromatic ring are different from one another.

U.S. Pat. No. 6,770,693 and U.S. Patent Publication No. 2005/0113494 disclose blends of phosphites and hindered phenols as polymer stabilizers. The exemplified blends included a non-symmetrically hindered phosphite (such as DOVERPHOS® S-9228) and a symmetrically hindered phenol (such as tetrakis[methylene (3,5-di-tert-butyl-4-hydroxyhydrocinnamate)]methane). For blends containing a second phosphite, the optimum ratio of DOVERPHOS S-9228 to the second phosphite was apparently greater than one, indicating that the DOVERPHOS® S-9228 drove the performance of these blends.

There is a need for improved polymer stabilizers, polymer compositions that include such stabilizers, and methods of making such polymer compositions.

SUMMARY OF THE INVENTION

In an aspect, the preferred embodiments of the present invention provide a stabilizer composition. The stabilizer composition comprises a hindered arylalkyl phosphite of the formula (I) or (II),

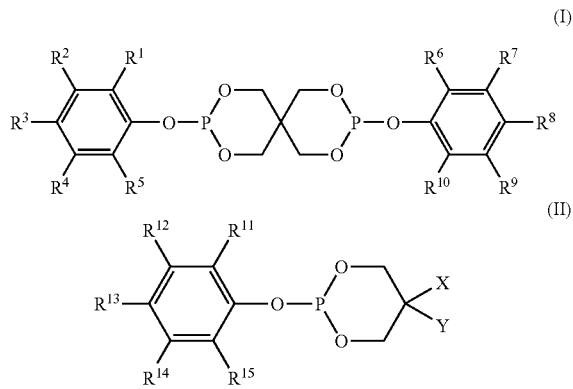

where $R^1$ and $R^5$ together comprise at least 5 carbons, where $R^6$ and $R^{10}$ together comprise at least 5 carbons, where $R^{11}$ and $R^{15}$ together comprise at least 5 carbons, and where $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, X and Y are each individually selected from hydrogen, $C_1$-$C_{12}$ alkyl, $C_3$-$C_{12}$ cycloalkyl, $C_4$-$C_{12}$ alkyl cycloalkyl, $C_6$-$C_{10}$ aryl, and $C_7$-$C_{12}$ alkylaryl. In a preferred embodiment, at least one of $R^1$ and $R^5$ comprises a tertiary carbon, at least one of $R^6$ and $R^{10}$ comprises a tertiary carbon, and/or at least one of $R^{11}$ and $R^{15}$ comprises a tertiary carbon. The composition further comprises a trisarylphosphite of the formula (III),

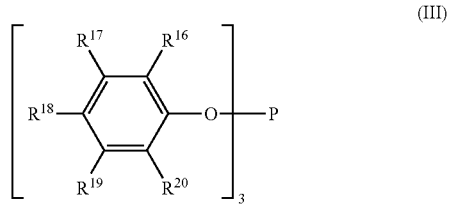

where $R^{16}$, $R^{17}$, $R^{18}$, $R^{19}$, and $R^{20}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl. The composition further comprises a hindered phenol comprising a molecular fragment selected from formulas (IVa), (IVb) and (IVc),

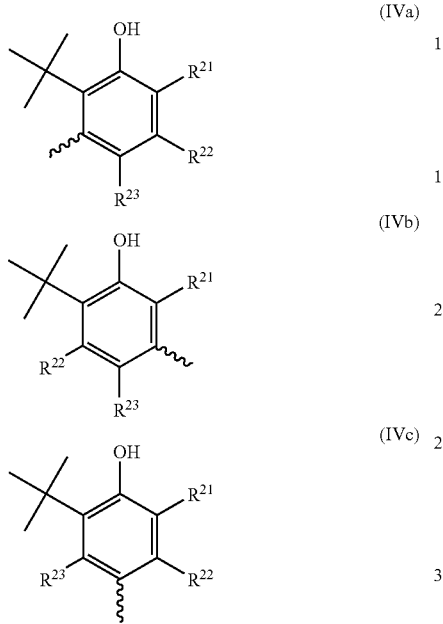

where $R^{21}$ is selected from hydrogen and $C_{1-3}$ alkyl and where $R_{22}$ and $R_{23}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl. Hindered phenols comprising a molecular fragment selected from formulas (IVa), (IVb) and (IVc) may be referred to collectively herein as compounds of the formula (IV).

In an aspect, the preferred embodiments of the present invention provide a polymer composition. The polymer composition comprises a polymer and a stabilizing amount of a stabilizer composition. The stabilizer composition comprises a hindered arylalkyl phosphite of the formula (I) or (II), a trisarylphosphite of the formula (III), and a hindered phenol comprising a molecular fragment selected from formulas (IVa), (IVb) and (IVc), as described above.

In an aspect, the preferred embodiments of the present invention provide a polymer composition, comprising a polyolefin and a polyolefin-stabilizing amount of a hindered arylalkyl phosphite selected from 2-butyl-2-ethyl-1,3-propanediol 2,4,6-tri-t-butylphenol phosphite (ULTRANOX® 641), bis-(2,6-di-t-butyl-4-methlphenyl)pentaerythritol diphosphite (ADK Stabilizer PEP 36), (bis-(2,4-dicumylphenyl)pentaerythritol diphosphite (DOVERPHOS® 9228), 2-butyl-2-ethyl-1,3-propanediol 2,4-di-cumylphenol phosphite, 2-butyl-2-ethyl-1,3-propanediol 4-methyl-2,6-di-t-butylphenol phosphite, and bis-(2,4,6-tri-t-butyl-phenyl)pentaerythritol diphosphite. The polymer composition further comprises a polyolefin-stabilizing amount of a trisarylphosphite selected from tris-(2,4-di-t-butylphenyl)phosphite (IRGANOX® 168), tris(4-nonylphenyl phosphite (TNPP) and triphenyl phosphite (DOVERPHOS® 10). The polymer composition additionally comprises a polyolefin-stabilizing amount of a hindered phenol selected from (1,3,5-Tris(4-t-butyl-3-hydroxy-2,6-dimethylbenzyl)-1,3,5-triazine-2,4,6-(1H,3H,5H)-trione (CYANOX® 1790), 1,1,3-Tris(2'-methyl-4'-hydroxy-5'-t-butylphenyl)butane, Triethylene glycol bis[3-(3-t-butyl-4-hydroxy-5-methylphenyl)propionate] (IRGANOX® 245), 4,4'-Thiobis(2-t-butyl-5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene(3-t-butyl-4-hydroxy-5-methylhydrocinnamate)methane,N,N'-Hexamethylene bis[3-(3-t-butyl-4-hydroxy-5-methylphenyl)propionamide], and Di(4-tertiarybutyl-3-hydroxy-2,6-dimethyl benzyl)thiodipropionate.

In an aspect, the preferred embodiments of the present invention provide a process for making a stabilized polymer composition. The process comprises mixing a polymer with a stabilizing amount of a stabilizer composition. The stabilizer composition comprises a hindered arylalkyl phosphite of the formula (I) or (II), a trisarylphosphite of the formula (III), and a hindered phenol comprising a molecular fragment selected from formulas (IVa), (IVb) and (IVc), as described above.

These and other aspects and embodiments are described in greater detail below.

DETAILED DESCRIPTION OF THE PREFERRED EMBODIMENTS

It has been discovered that antioxidant stabilizer blends of an aryl dialkyl phosphite and a trisarylphosphite demonstrate unexpected benefits when used in combination with at least one phenol antioxidant having reduced hindrance about the phenolic oxygen, as compared to highly hindered phenols more typically used in such applications. For example, in an embodiment, the phenol antioxidant is a non-symmetrically hindered phenol in which the phenolic oxygen is flanked by a t-butyl group and a hydrogen or $C_{1-3}$ alkyl group. The aryl dialkyl phosphite in the blend is preferably significantly hindered about the oxygen atom that is attached to the aromatic ring. For example, in an embodiment, at least one of the groups flanking the oxygen atom that is attached to the aromatic ring of the aryl dialkyl phosphite is a group that comprises a tertiary carbon, such as a tertiary alkyl group or a cumyl group, and the groups flanking the oxygen atom together preferably comprise at least five carbons, more preferably at least eight carbons. Surprisingly, in antioxidant stabilizer blends of an aryl dialkyl phosphite and a trisarylphosphite in combination with a reduced hindrance phenol, relatively greater hindrance is preferred about the oxygen atom that is attached to the aromatic ring of the aryl dialkyl phosphite, as compared to aryl dialkyl phosphites typically used in such applications.

It has been further discovered in preferred stabilizer blends that ratios of trisarylphosphite to aryl dialkyl phosphites greater than one provide improved performance. Compared to similar stabilizer blends utilizing a more highly hindered phenol antioxidant, and/or a less hindered aryl dialkyl phosphite, preferred blends provide better protection against polymer degradation during processing as evidenced by reduced discoloration during compounding, reduced discoloration during low shear, long residence time thermally induced sintering processes, such as rotational molding, and/or reduced changes in melt flow after high temperature exposure in an oxygen rich environment. Embodiments of the present invention provide significant advantages over previous blends, including current commercially available additive blends.

Stabilizer Compositions

In an embodiment, a stabilizer composition comprises a hindered arylalkyl phosphite of the formula (I) or (II); a trisarylphosphite of the formula (III); and a hindered phenol comprising a molecular fragment selected from formulas (IVa), (IVb) and (IVc), each as set forth above. In an embodiment of the stabilizer composition, $R^1$ and $R^5$ together comprise at least 8 carbons, $R^6$ and $R^{10}$ together comprise at least 8 carbons, and/or $R^{11}$ and $R^{15}$ together comprise at least 8 carbons. In another embodiment of the stabilizer composition, $R^1$, $R^6$ and/or $R^{11}$ is H. In a further embodiment of the stabilizer composition, $R^5$, $R^{10}$ and/or $R^{15}$ is cumyl. In another embodiment of the stabilizer composition, $R^{21}$ is methyl.

In another embodiment of the stabilizer composition, the hindered arylalkyl phosphite is selected from 2-butyl-2-ethyl-1,3-propanediol 2,4,6-tri-t-butylphenol phosphite, bis-(2,6-di-t-butyl-4-methlphenyl)pentaerythritol diphosphite, (bis-(2,4-dicumylphenyl)pentaerythritol diphosphite, 2-butyl-2-ethyl-1,3-propanediol 2,4-di-cumylphenol phosphite, 2-butyl-2-ethyl-1,3-propanediol 4-methyl-2,6-di-t-butylphenol phosphite, and bis-(2,4,6-tri-t-butyl-phenyl)pentaerythritol diphosphite.

In another embodiment of the stabilizer composition, the trisarylphosphite is selected from tris-(2,4-di-t-butylphenyl) phosphite, tris(4-nonylphenyl phosphite, and triphenyl phosphite.

In another embodiment of the stabilizer composition, the hindered phenol is selected from (1,3,5-Tris(4-t-butyl-3-hydroxy-2,6-dimethylbenzyl)-1,3,5-triazine-2,4,6-(1H, 3H, 5H)-trione, 1,1,3-Tris(2'-methyl-4'-hydroxy-5'-t-butylphenyl)butane, Triethylene glycol bis[3-(3-t-butyl-4-hydroxy-5-methylphenyl)propionate], 4,4'-Thiobis(2-t-butyl-5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene(3-t-butyl-4-hydroxy-5-methylhydrocinnamate)methane,N,N'-Hexaethylene bis[3-(3-t-butyl-4-hydroxy-5-methylphenyl) propionamide], and Di(4-tertiarybutyl-3-hydroxy-2,6-dimethyl benzyl)thiodipropionate.

Embodiments of the hindered phenols described above are substantially less hindered than antioxidant phenols which are conventionally utilized in antioxidant compositions, owing to the generally smaller groups flanking the phenolic oxygen. As discussed in greater detail below, embodiments of the stabilizer compositions utilized in polymer compositions provide unexpectedly beneficial properties to the polymer compositions, such as improved color and/or impact strength.

In an embodiment of the stabilizer composition, it has been discovered that certain proportions of the arylalkyl phosphites to the trisarylphosphites provide improved stabilizer performance. For example, in an embodiment, the weight ratio of the hindered arylalkyl phosphite to the trisarylphosphite is less than one, e.g., the weight ratio of the hindered arylalkyl phosphite to the trisarylphosphite is in the range of from about 1:15 to about 4:5, preferably in the range of from about 1:10 to about 2:3.

The amounts of each of the components of the stabilizer compositions may vary over a broad range, e.g., the stabilizer composition may comprise from about 0.01% to about 99.99% of the hindered arylalkyl phosphite of the formula (I) or (II), from about 0.01% to about 99.99% of the trisarylphosphite of the formula (III), and from about 0.01% to about 99.99% of the hindered phenol comprising a molecular fragment selected from formulas (IVa), (IVb) and (IVc), each by weight based on total stabilizer composition weight. It will be understood that the amounts of each of the aforementioned three components of the stabilizer composition may be adjusted relative to one another so that the total of the three components is 100%, or the stabilizer composition may contain one or more additional components (such as a polymer, HALS and/or ultraviolet light absorber as described below), in which case the total amount of the aforementioned three components in the stabilizer composition is less than 100%.

Polymer Compositions and Processes for Making them

Embodiments of the present invention also provide polymer compositions and processes for making them, e.g., by intermixing a stabilizer composition as described herein with a polymer to produce a stabilized polymer composition. In certain embodiments, these stabilized polymer compositions are suitable for use in conjunction with rotational molding techniques to form molded parts.

In a preferred embodiment, a stabilizer composition suitable for intermixing with a polymer comprises a polymer stabilizing amount of a hindered arylalkyl phosphite of the formula (I) or (II), a polymer stabilizing amount of a trisarylphosphite of the formula (III), and a polymer stabilizing amount of a hindered phenol comprising a molecular fragment selected from formulas (IVa), (IVb) and (IVc), as described above. The stabilizing amount of the stabilizer composition in the polymer composition may vary over a broad range as determined by routine experimentation, and is typically in the range of from about 0.001% to about 5%, preferably in the range of from about 0.01% to about 1.0%, by weight based on the total weight of the polymer composition. In an embodiment, the hindered arylalkyl phosphite of the formula (I) or (II) and the trisarylphosphite of the formula (III) are together present in the polymer composition in a total phosphite amount in the range of about 0.01 wt. % to about 1.0 wt %, preferably in the range of about 0.02 wt. % to about 0.5 wt %, based on total polymer composition weight. In an embodiment, the amount of the hindered arylalkyl phosphite utilized in the polymer composition is less than the amount of the trisarylphosphite on a weight basis. In an embodiment, the hindered phenol comprising a molecular fragment selected from formulas (IVa), (IVb) and (IVc) is present in the polymer composition in an amount in the range of about 0.01 wt. % to about 1.0 wt %, preferably in the range of about 0.02 wt. % to about 0.5 wt %, based on total polymer composition weight.

In an embodiment of the polymer composition, the hindered arylalkyl phosphite is selected from 2-butyl-2-ethyl-1, 3-propanediol 2,4,6-tri-t-butylphenol phosphite, bis-(2,6-di-t-butyl-4-methlphenyl)pentaerythritol diphosphite, (bis-(2,4-dicumylphenyl)pentaerythritol diphosphite, 2-butyl-2-ethyl-1,3-propanediol 2,4-di-cumylphenol phosphite, 2-butyl-2-ethyl-1,3-propanediol 4-methyl-2,6-di-t-butylphenol phosphite, and bis-(2,4,6-tri-t-butyl-phenyl)pentaerythritol diphosphite.

In another embodiment of the polymer composition, the trisarylphosphite is selected from tris-(2,4-di-t-butylphenyl) phosphite, tris(4-nonylphenyl phosphite (TNPP) and triphenyl phosphite.

In another embodiment of the polymer composition, the hindered phenol is selected from (1,3,5-Tris(4-t-butyl-3-hydroxy-2,6-dimethylbenzyl)-1,3,5-triazine-2,4,6-(1H,3H, 5H)-trione, 1,1,3-Tris(2'-methyl-4'-hydroxy-5'-t-butylphenyl)butane, Triethylene glycol bis[3-(3-t-butyl-4-hydroxy-5-methylphenyl)propionate], 4,4'-Thiobis(2-t-butyl-5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene(3-t-butyl-4-hydroxy-5-methylhydrocinnamate)methane,N,N'-Hexamethylene bis[3-(3-t-butyl-4-hydroxy-5-methylphenyl)propionamide], and Di(4-tertiarybutyl-3-hydroxy-2,6-dimethyl benzyl)thiodipropionate.

In an embodiment, a process for making a stabilized polymer composition comprises mixing a polymer and a stabilizing amount of a stabilizer composition as described herein. In a preferred embodiment, the stabilizing amount of the stabilizer composition is an amount that is effective to reduce yellowing. In certain embodiments, the process comprises intermixing about 0.01 wt % to about 1.0 wt %, preferably about 0.02 wt % to about 0.5 wt % of the stabilizer composition with the polymer, by weight based on total amount of the resulting polymer composition. It will be understood that the components may be intermixed in any manner, e.g., singly, in portions, pre-mixed, etc. For example, in an embodiment, the stabilizer composition is formed in the presence of the polymer, e.g., by adding at least a portion of at least one of the hindered arylalkyl phosphite of the formula (I) or (II), the trisarylphosphite of the formula (III), and the hindered phenol comprising a molecular fragment selected from formulas (IVa), (IVb) and (IVc), to the polymer separately from at least a portion of the remainder of the other components of the stabilizer composition.

The components of the stabilized polymer composition may be mixed in any order. In an embodiment, the mixing comprises at least one technique selected from extruding, pelletizing, and molding. In a further embodiment, the molding comprises at least one technique selected from blow molding, injection molding, and rotational molding. In alternative embodiments, mixing may be carried out by a process that comprises at least one of melting, dissolution in a solvent, and dry mixing.

In an embodiment, the polymer composition described above (e.g., comprising a hindered arylalkyl phosphite of the formula (I) or (II); a trisarylphosphite of the formula (III); and a hindered phenol comprising a molecular fragment selected from formulas (IVa), (IVb) and (IVc)) further comprises a light stabilizer, such as a hindered amine light stabilizer (HALS), a hindered hydroxyl benzoate, a nickel phenolate and/or an ultraviolet light absorber (UVA). The light stabilizer may be a mixture, e.g., the light-stabilized polymer composition may comprise a HALS and a UVA. A light-stabilized polymer composition preferably comprises a light-stabilizing amount of the light stabilizer, e.g., an amount of light stabilizer that stabilizes the polymer composition against the degradative effects of visible and/or ultraviolet radiation, as determined by routine experimentation.

In an embodiment, the polymer composition described above (e.g., comprising a hindered arylalkyl phosphite of the formula (I) or (II); a trisarylphosphite of the formula (III); and a hindered phenol comprising a molecular fragment selected from formulas (IVa), (IVb) and (IVc)) further comprises a light-stabilizing amount of a HALS. The amount of HALS in such a light-stabilized polymer composition is preferably in the range of about 0.01 wt. % to about 1.0 wt %, preferably in the range of about 0.02 wt. % to about 0.5 wt %, based on total polymer composition weight. Such a polymer composition may be prepared by intermixing the components in the general manner described above. For example, in an embodiment, a process for forming a polymer composition comprises mixing the polymer, a stabilizer composition as described above and a light-stabilizing amount of the HALS. In an embodiment, the HALS comprises a molecular fragment of the formula (V),

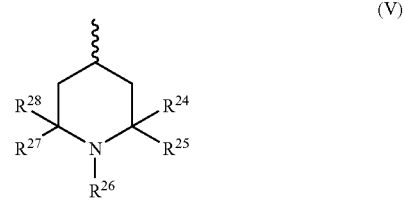

where $R^{24}$, $R^{25}$, $R^{26}$, and $R^{27}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl; and where $R^{28}$ is selected from hydrogen, $C_1$-$C_{20}$ alkyl, $C_1$-$C_{20}$ acyl and $C_1$-$C_{20}$ alkoxyl.

In a preferred embodiment, the HALS included in the composition or utilized in the process for making it is selected from bis(2,2,6,6-tetramethylpiperidin-4-yl)sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl)n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl)nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of 2-chloro-4,6-bis(4-n-butylamino-2,2,6,6-tetramethylpiperidyl) 1,3,5-triazine and 1,2-bis(3-aminopropylamino) ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines and a reaction product of 7,7,9,9-tetramethyl-2-cycloundecyl-1-oxa-3,8-diaza-4-oxospiro[4.5]decane and epichlorohydrin.

In an embodiment, the polymer composition described above (e.g., comprising a hindered arylalkyl phosphite of the formula (I) or (II); a trisarylphosphite of the formula (II); and a hindered phenol comprising a molecular fragment selected from formulas (IVa), (IVb) and (IVc)) further comprises a light-stabilizing amount of a UVA. Such a polymer composition preferably comprises an ultraviolet-light absorbing amount of the UVA, e.g., an amount of UVA that alone or in combination with a second light stabilizer (e.g., a HALS) stabilizes the polymer composition against the degradative effects of ultraviolet radiation, as determined by routine experimentation. When used without a second light stabilizer, e.g., in the absence of a HALS, the amount of UVA in the polymer composition is preferably in the range of about 0.025 wt. % to about 2.5 wt. %, based on total polymer composition weight. When used in combination with a light-stabilizing amount of a HALS, the amount of UVA in the polymer composition is preferably in the range of about 0.001 wt. % to about 1.0 wt %, more preferably in the range of about 0.002 wt. % to about 0.5 wt %, based on total polymer composition weight. Such polymer compositions may be prepared by intermixing the components in the general manner described above. For example, in an embodiment, a process for forming a polymer composition comprises mixing the polymer and a stabilizer composition as described above (optionally including a light-stabilizing amount of a HALS) with a light-absorbing amount of an ultraviolet light absorber selected from a 2-hydroxybenzophenone, a 2-(2'-hydroxyphenyl)benzotriazole, and a 2-(2'-hydroxyphenyl)-1,3,5-triazine. In a preferred embodiment of the composition or the process for making it, the UVA is a 2-(2'-hydroxyphenyl)-1,3,5-triazine of the formula (VI),

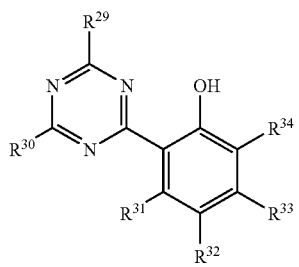

(VI)

where $R^{29}$ and $R^{30}$ are each individually selected from $C_6$-$C_{10}$ aryl, $C_1$-$C_{10}$ alkyl-substituted amino, $C_1$-$C_{10}$ acyl and $C_1$-$C_{10}$ alkoxyl; and $R^{31}$, $R^{32}$, $R^{33}$ and $R^{34}$ are each individually selected from hydrogen, hydroxyl, $C_1$-$C_{10}$ alkyl, $C_1$-$C_{10}$ alkoxyl, $C_1$-$C_{10}$ acyl, $C_3$-$C_{12}$ cycloalkyl, $C_4$-$C_{12}$ alkyl cycloalkyl, $C_6$-$C_{10}$ aryl, and $C_7$-$C_{12}$ alkylaryl.

In an embodiment, the polymer composition described above (e.g., comprising a hindered arylalkyl phosphite of the formula (I) or (II); a trisarylphosphite of the formula (III); and a hindered phenol comprising a molecular fragment selected from formulas (IVa), (IVb) and (IVc)) further comprises a light-stabilizing amount of a hindered hydroxyl benzoate. Examples of hindered hydroxyl benzoates that may be incorporated into the polymer composition or used in the process for making it include those described in U.S. Pat. No. 6,843,939, which is hereby incorporated by reference in its entirety, and particularly for the purpose of describing hindered hydroxyl benzoates. The amount of hindered hydroxyl benzoate in the polymer composition is preferably in the range of about 0.001 wt. % to about 3.0 wt %, more preferably in the range of about 0.01 wt. % to about 2.0 wt %, based on total polymer composition weight. Such polymer compositions may be prepared by intermixing the components in the general manner described above.

In an embodiment, the polymer composition described above (e.g., comprising a hindered arylalkyl phosphite of the formula (I) or (II); a trisarylphosphite of the formula (III); and a hindered phenol comprising a molecular fragment selected from formulas (IVa), (IVb) and (IVc)) further comprises a light-stabilizing amount of a nickel quencher, e.g., a nickel phenolate. A variety of nickel quenchers are known to those skilled in the art and include those that are widely used in agricultural film applications where they are valued for their resistance to deactivation by agricultural chemicals. Examples of nickel quenchers that may be incorporated into the polymer composition or used in the process for making it include those described in U.S. Pat. Nos. 3,215,707 and 3,218,294, both of which are hereby incorporated by reference in their entireties, and particularly for the purpose of describing nickel quenchers. The amount of nickel quencher in the polymer composition is preferably in the range of about 0.001 wt. % to about 2.0 wt %, more preferably in the range of about 0.005 wt. % to about 1.0 wt %, based on total polymer composition weight. Such polymer compositions may be prepared by intermixing the components in the general manner described above.

In a preferred embodiment, the polymer comprises a polyolefin although it is envisioned that embodiments of the process may be directed to polymer compositions comprising other polymers as well.

The term "polyolefin" is used herein in its ordinary sense as known to those skilled in the art and includes homopolymers as well as copolymers of olefinic compounds. Typically, polyolefin homopolymers comprise the polymerization products of mono-1-olefins having about 2 to about 10 carbon atoms per molecule, preferably, about 2 to about 6 carbon atoms per molecule. Exemplary mono-1-olefins, which produce polyolefins having desirable properties, include, but are not limited to, ethylene, propylene, 1-butene, 1-pentene, 1-hexene, and 1-octene. In an embodiment, the mono-1-olefin is ethylene and the resulting polymer is polyethylene (e.g., high density polyethylene). Suitable polyolefin copolymers comprise at least 2 different mono-1-olefins, a monomer and one or more co-monomers, each having from about 2 to about 16 carbon atoms per molecule. Preferably the monomers include, but are not limited to, ethylene, propylene, 1-butene, 1-pentene, 1-hexene, and 1-octene. Exemplary comonomers include, but are not limited to, aliphatic 1-olefins, such as propylene, 1-butene, 1-pentene, 4-methyl-1-pentene, 1-hexene, 1-octene, and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Linear low density polyethylene (LLDPE) is a preferred copolymer that is made by a process that comprises copolymerizing ethylene and small amounts of a higher alpha-olefin comonomer having from about 3 to about 16 carbon atoms per molecule.

EXAMPLES

The following examples are provided to assist one skilled in the art to further understand embodiments of the present invention. These examples are intended for illustration purposes but are not to be construed as limiting the scope of the embodiments of the present invention.

Chemical compounds utilized in these examples (summarized below) are obtained from commercial sources or prepared by known methods:

Phosphite Antioxidants:

P1. (tris-(2,4-di-t-butylphenyl)phosphite) (IRGAPHOS® 168)

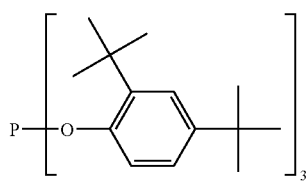

P2. (bis-(2,4-dicumylphenyl)pentaerythritol diphosphite (DOVERPHOS® 9228)

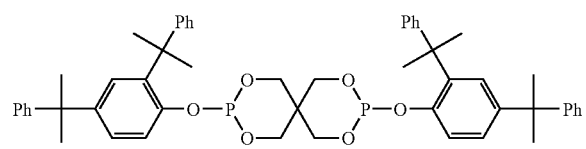

P3. bis-(2,4-di-t-butylphenyl)pentaerythritol diphosphite (Ultranox 626)

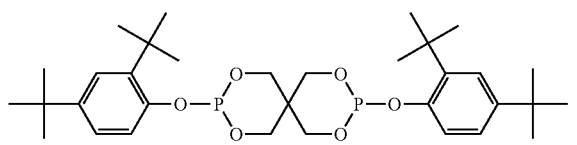

P4. 2-butyl-2-ethyl-1,3-propanediol 2,4,6-tri-t-butylphenol phosphate (ULTRANOX® 641)

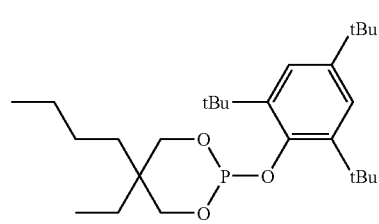

P5. bis-(2,6-di-t-butyl-4-methlphenyl)pentaerythritol diphosphite (ADK PEP 36)

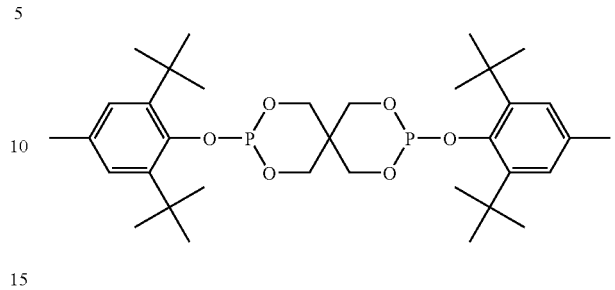

P6. Tris(4-n-nonylphenyl)phosphite (TNPP)

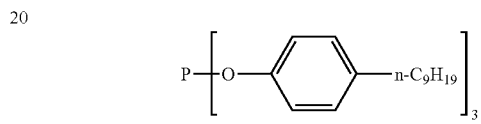

Phenol Antioxidants:

AO1. Tetrakismethylene(3,5-di-t-butyl-4-hydroxyhydrocinnamate) methane (IRGANOX® 1010)

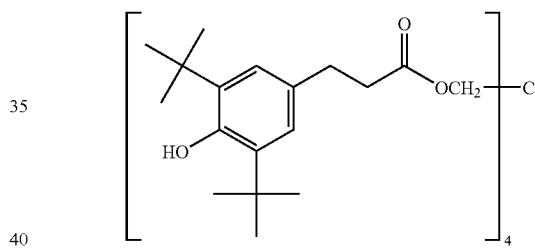

AO2. (1,3,5-tris(4-t-butyl-3-hydroxy-2,6-dimethyl benzyl)-1,3,5-triazine-2,4,6-(1H,3H,5H)-trione (CYANOX® 1790)

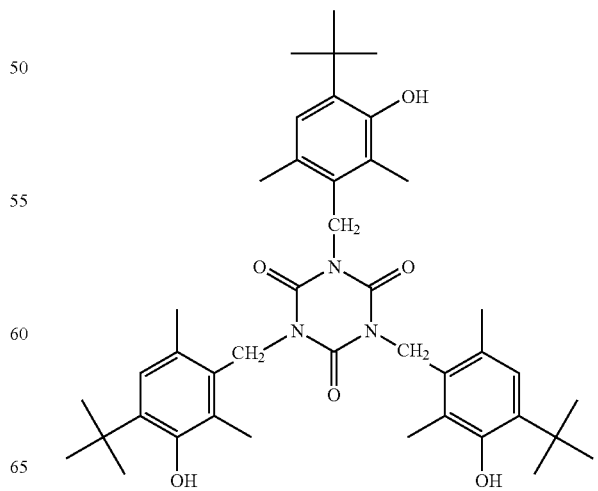

AO3. 1,3,5-Tris(3,5-di-t-butyl-4-hydroxybenzyl) isocyanurate (IRGANOX® 3114)

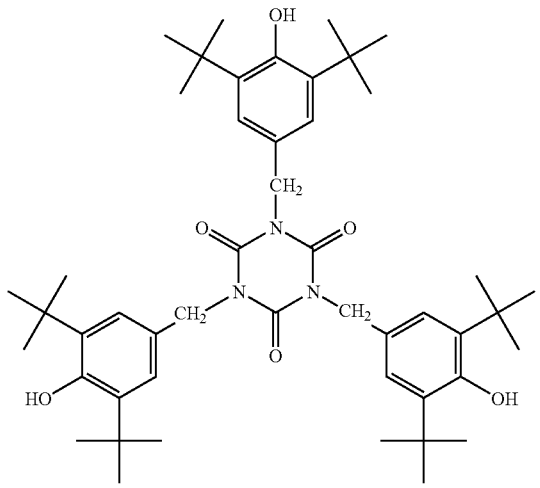

AO4. Triethylene glycol bis[3-(3-t-butyl-4-hydroxy-5-methylphenyl)propionate] (IRGANOX® 245)

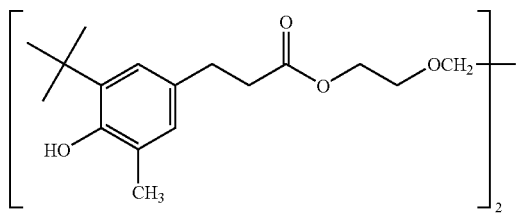

AO5. Di(4-tertiarybutyl-3-hydroxy-2,6-dimethyl benzyl)thiodipropionate

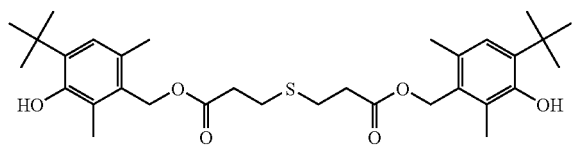

Light Stabilizers:

LS1: 1,6-hexanediamine,N,N'-bis(2,2,6,6-tetramethyl)-4-piperidinyl)-, polymers with 2,4-dichloro-6-(4-morpholinyl)-1,3,5-triazine (CYASORB® UV-3346). LS1 is a HALS.

LS2: 2-[4,6-bis(2',4'-dimethylphenyl)-1,3,5-triazin-2-yl]-5-octyloxyphenol (CYASORB® UV-1164). LS2 is a UVA LS3: 1,6-hexanediamine,N,N'-bis(1,2,2,6,6-pentamethyl)-4-piperidinyl)-, polymers with 2,4-dichloro-6-(4-morpholinyl)-1,3,5-triazine (CYASORB® UV-3529). LS3 is a HALS.

LS4: Dimethyl Succinate polymer w/4-Hydroxy-2,2,6,6-tetramethyl-1-piperidine ethanol (CAS No. 65447-77-0). LS4 is a HALS.

In the examples, the following physical properties are measured by techniques set forth in the corresponding ASTM standard:

Yellowness Index: ASTM E313, ASTM D6290
Melt Index: ASTM D1238, D2839
Weathering: ASTM G154
Impact Strength ARM Impact, ASTM D3029
Colorguard instrument: MacBeth Color-Eye 7000 Spectrophotometer (Equation-Hunter Lab; Observer-2o; Primary Illuminant-C).

In certain embodiments, polymer compositions are made using rotational molding techniques that are generally accepted by those skilled in the art as being representative of commercial rotational molding processes. These rotational molding techniques involve the use of a rotational mold and an oven. A polymer composition (e.g., a stabilized polymer composition comprising a stabilizer composition as described herein) is placed in the mold, which possesses a predetermined shape. The mold is heated within the oven at a predetermined rate to a peak temperature. During heating, the resin melts and the mold is rotated in three dimensions to ensure that the melted resin evenly coats the interior surfaces of the mold. Optionally, the melted resin may be cured for a predetermined time. After heating is complete, the mold is removed from the oven and cooled, with the mold still in rotation. Once cool, the formed plastic part is removed from the mold.

Examples 1-12

Examples 1-12 illustrate the melt index and the color, as measured by the yellowness index, of polymer compositions utilizing stabilizer compositions that contain reduced hindrance phenols and compare these properties to those of compositions that contain more highly hindered phenols.

Exxon LL8400 grade of LLDPE is dry blended with about 350 ppm of zinc stearate, about 1090 ppm of LS1, about 110 ppm of LS2, about 435 ppm of P1, about 120 ppm of P2, and about 245 ppm of a phenolic antioxidant as shown in TABLES 1-3 below. The dry blend is extruded using a single screw extruder at a melt temperature of about 190° C. After measuring the color of the pelletized resin using a Colorguard instrument, the resin is ground to a fine powder. About 10 g of resin is poured into an approximately 5 cm×5 cm steel mold and placed on an open compression mold platen at a set point temperature of about 300° C. for about 12 minutes. After cooling to crystallization point at about ambient temperature, the plaque is removed from the mold and the yellowness index is measured on both the air and mold surface of the plaque. The results of these tests are reported in TABLES 1-3 below. TABLE 1 provides the Yellowness Index (YI) values of the LLDPE pellets after compounding, TABLE 2 provides YI values of the plaques (side exposed to air and side in contact with mold), and TABLE 3 provides the Melt Index (MI) of the resin samples immediately after compounding and after the open air sintering process. The resin had an initial MI of 3.3 g/10 min.

TABLE 1

| No. | Phenolic Antioxidant | YI |
|---|---|---|
| 1C | AO1 | 0.23 |
| 2 | AO4 | −1.26 |
| 3C | AO3 | 0.76 |
| 4 | AO2 | −1.54 |

TABLE 2

| No. | Phenolic Antioxidant | YI (air) | YI (mold) |
|---|---|---|---|
| 5C | AO1 | 16.7 | 2.7 |
| 6 | AO4 | 1.7 | −1.3 |
| 7C | AO3 | 12.7 | 3.1 |
| 8 | AO2 | 0.83 | −0.63 |

TABLE 3

| No. | Phenolic Antioxidant | MI (after compounding) | MI (after sintering) |
|---|---|---|---|
| 9C | AO1 | 3.11 | 2.21 |
| 10 | AO4 | 3.27 | 2.37 |
| 11C | AO3 | 3.19 | 2.24 |
| 12 | AO2 | 3.23 | 2.79 |

Examples 1-12 demonstrate that, in stabilizer compositions containing combinations of P1 (of formula III) and P2 (of formula I), reduced hindrance phenols AO2 and AO4 (of formula IV) provide improved color in pellets and sintered resins, as compared to more highly hindered phenols AO1 and AO3. As shown in TABLES 1-2, the yellowness index of polymers stabilized with combinations containing less hindered phenols is significantly lower than polymers stabilized with combinations containing more highly hindered phenols. Thus, Examples 1-12 illustrate that stabilizer compositions containing a phosphite of formula I, a trisaryl phosphite of formula III, and a reduced hindrance phenol of formula IV provide generally superior color to otherwise similar stabilizer compositions containing more highly hindered phenols.

Examples 13-16

Examples 13-16 illustrate and compare the color of polymer compositions containing stabilizer compositions similar to those described in Examples 1-12, except without the light stabilizer compounds.

Exxon LL8400 grade of LLDPE is dry blended with approximately 350 ppm of zinc stearate, approximately 435 ppm of P1, approximately 120 ppm of P2 and approximately 245 ppm of a phenolic antioxidant. The dry blend is extruded using a single screw extruder at a melt temperature of approximately 190° C. After measuring the color of the pelletized resin using a Colorguard instrument, the resin is ground to a fine powder. Approximately 10 g of resin is poured into an approximately 5 cm×5 cm steel mold and placed on an open compression platen at a set point temperature of approximately 300° C. for approximately 12 minutes. After cooling to a crystallization point at approximately ambient temperature, the plaque is removed from the mold and the yellowness index is measured on both the air and mold surface of the plaque. TABLE 4 provides the YI values of the pellets after compounding and TABLE 5 provides YI values of the plaques (side exposed to air and side in contact with mold).

TABLE 4

| No. | Phenolic Antioxidant | YI |
|---|---|---|
| 13C | AO1 | 0.06 |
| 14 | AO2 | −1.92 |

TABLE 5

| No. | Phenolic Antioxidant | YI (air) | YI (mold) |
|---|---|---|---|
| 15C | AO1 | 4.62 | 0.6 |
| 16 | AO2 | 1.43 | −0.75 |

Examples 13-16 demonstrate that polymers stabilized with combinations containing less hindered phenol antioxidants exhibit improved color. As illustrated in TABLES 4 and 5, the color of polymer compositions containing phenol antioxidant AO1, a more highly hindered phenol antioxidant, are significantly higher than polymer compositions containing a phosphite of formula I, a trisaryl phosphite of formula III and AO2, a less hindered phenol antioxidant, in both pellet and sintered resin forms. These trends are consistent with those shown in TABLES 1-3 for Examples 1-12.

Examples 17-22

Examples 17-22 illustrate the effect of varying the ratio of P1 and P2 on the color of polymer compositions containing P1, P2, and AO2. Exxon LL8400 grade of LLDPE is dry blended with about 350 ppm of zinc stearate, about 1090 ppm of LS1, about 110 ppm of LS2, about 245 ppm of AO2, and varying amounts of trisarylphosphites (P1) with pentaerythritol phosphites (P2). The dry blend is extruded using a single screw extruder with a melt temperature of about 190° C. After measuring the color of the pelletized resin using a Colorguard instrument, the resin is ground to a fine powder. About 10 g of resin is poured into an approximately 5 cm×5 cm steel mold and placed on an open compression platen at a set point temperature of about 300° C. for about 12 minutes. After cooling to crystallization point at about ambient temperature, the plaque is removed from the mold and the color measured on both the air and mold surface of the plaque. TABLE 6 provides the YI values of the pellets after compounding and TABLE 7 provides YI values of the plaques (side exposed to air and side in contact with mold).

TABLE 6

| No. | P1 (ppm) | P2 (ppm) | YI |
|---|---|---|---|
| 17 | 500 | 55 | −1.74 |
| 18 | 435 | 120 | −1.55 |
| 19 | 310 | 245 | −0.82 |

TABLE 7

| No. | P1 (ppm) | P2 (ppm) | YI (air) | YI (mold) |
|---|---|---|---|---|
| 20 | 500 | 55 | 10 | 3.6 |
| 21 | 435 | 120 | 0.83 | −0.6 |
| 22 | 310 | 245 | 4.37 | 1.19 |

Examples 17-22 illustrate that in stabilized polymer compositions containing trisarylphosphites (P1) and pentaerythritol phosphites (P2) in combination with reduced hindrance phenol antioxidants, it is generally preferred to have a lower ratio of P2 to P1 to provide low color. As shown in TABLES 6 and 7, a general decrease is observed in the yellowness index of pelletized LLDPE as the proportion of P2 to P1 decreases. In sintered powder resins, YI decreases as the P2 to P1 ratio decreases to a ratio of about 1:4. Thus, Examples 17-22 illustrate polymer compositions in which preferred proportions of phosphite antioxidants in combination with reduced hindrance phenol antioxidants as polymer stabilizers provide improved color.

Examples 23-35

Lyondell 662-grade of LLDPE is dry blended with approximately 350 ppm of zinc stearate, 1090 ppm of LS1, approximately 110 ppm of LS2, approximately 245 ppm of AO2 along with phosphite blends comprising a trisaryl phosphite (Phosphite A) and a pentaerythritol-based phosphite (Phosphite B) as specified in the tables below. The dry blend is extruded using a single screw extruder with a melt temperature of approximately 190° C. The extrudate is pelletized and the color of the resin measured directly on the pellets using a Colorguard instrument (TABLE 8). The pellets are then compression molded into plaques and exposed in a Q-Panel QUV accelerated weathering chamber. Color change is measured as a function of exposure time (TABLE 9). The pelletized resin is also ground to a fine powder. Approximately 10 g of resin is poured into an approximately 5 cm×5 cm steel mold and placed on a hot plate at a set point temperature of approximately 300° C. for approximately 10 minutes. After cooling to the crystallization point at ambient temperature, the plaque is removed from the mold and the color measured on moldside surface of the plaque (TABLE 10).

TABLE 8

| No. | Phosphite A (435 ppm) | Phosphite B (120 ppm) | YI |
|---|---|---|---|
| 23C | P1 | P3 | −2.62 |
| 24 | P1 | P4 | −2.62 |
| 25 | P1 | P2 | −2.79 |
| 26 | P1 | P5 | −2.62 |
| 27 | P6 | P2 | −2.67 |

TABLE 9

| No. | Phosphite A (435 ppm) | Phosphite B (120 ppm) | Change in YI |
|---|---|---|---|
| 28C | P1 | P3 | 1.7 |
| 29 | P1 | P4 | 1.1 |
| 30 | P1 | P2 | 1.1 |
| 31 | P1 | P5 | 1.4 |

TABLE 10

| No. | Phosphite A (435 ppm) | Phosphite B (120 ppm) | YI (mold) |
|---|---|---|---|
| 32C | P1 | P3 | −2.22 |
| 33 | P1 | P4 | −2.95 |
| 34 | P1 | P2 | −4.68 |
| 35 | P1 | P5 | −5.14 |

Examples 23-35 illustrate that in stabilizer compositions containing combinations of phosphites selected from the formulas I, II and III, along with a hindered phenol of the formula IV, it is preferable for the groups flanking the oxygen atom attached to the aromatic ring in the phosphite of formula I or II to together comprise at least 5 carbon atoms.

Examples 36-37

Examples 36-37 illustrates stabilizer compositions containing a combination of phosphites of the formulas I and III along with a hindered phenol of the formula IV for rotational molding applications.

Hunstman LX131 LLDPE (octene comonomer) is dry blended with about 500 ppm of calcium stearate, about 2000 ppm of LS3, about 300 ppm of AO2, about 600 ppm of P1, and about 100 ppm of a second phosphite as shown in TABLE 11 below. The dry blend is extruded using a single screw extruder with a melt temperature of about 190° C. The resin is subsequently ground to a fine powder. About 10 g of resin is poured into an approximately 5 cm×5 cm steel mold and placed into an oven equilibrated at about 250° C. for about 9 minutes. After cooling to a crystallization point at about ambient temperature, the plaque is removed from the mold and the color measured on both the air and mold surface of the plaque (TABLE 11).

TABLE 11

| No. | Second Phosphite (100 ppm) | YI (air) | YI (mold) |
|---|---|---|---|
| 36C | P3 | −1.78 | −2.33 |
| 37 | P2 | −3.35 | −3.79 |

Examples 36-37 demonstrate that stabilizer combinations containing phosphites of the formula I are preferable to otherwise similar stabilizer compositions in which the groups flanking the oxygen attached to the aromatic ring of the phosphite contain less than 5 carbon atoms, particularly for rotational molding applications.

Examples 38-40

The color of stabilized polymer compositions containing reduced hindrance phenols in combination with phosphite antioxidants is measured after 10 and 15 minute cures of pelletized resins. Exxon LL8400 grade of LLDPE is dry blended with approximately 350 ppm of zinc stearate, approximately 1090 ppm of LS1, approximately 110 ppm of LS2, approximately 435 ppm of P1, approximately 120 ppm of P2, and approximately 245 ppm of a phenolic antioxidant. The dry blend is extruded using a single screw extruder with a melt temperature of approximately 190° C. The resin is subsequently ground to a fine powder. Approximately 10 g of resin is poured into an approximately 5 cm×5 cm steel mold and placed on to a covered hotplate at a set point temperature of approximately 300° C. for 10 or 15 minutes. After cooling to a crystallization point at approximately ambient temperature, the plaque is removed from the mold and the color measured on surface of the plaque in contact with the metal mold (TABLE 12).

TABLE 12

| No. | Phenolic Antioxidant | YI (mold) 10 min cure | YI (mold) 15 min cure |
|---|---|---|---|
| 38C | AO3 | −1.38 | 21.07 |
| 39 | AO2 | −4.04 | 5.94 |
| 40 | AO5 | −5.07 | 12.2 |

Examples 38-40 illustrate that reduced hindrance phenols are generally superior to more highly hindered phenols when used in combination with the illustrated phosphite antioxidants.

Examples 41-44

Examples 41-44 measure and compare the yellowness index of stabilized polypropylene compositions containing reduced hindrance phenols and compositions containing more highly hindered phenol antioxidants. Basell PH350 polypropylene homopolymer is dry blended with about 245 ppm of the specified phenolic antioxidant, about 435 ppm of P1, about 120 ppm of P2, and about 500 ppm CaSt. The dry blend is extruded using a single screw extruder with a melt temperature of the extruder maintained at about 230° C. The extrudate is pelletized and the color of the resin is measured directly on the pellets using a Colorguard instrument (TABLE 13)

TABLE 13

| No. | Phenolic Antioxidant | YI |
|---|---|---|
| 41C | AO1 | 5.56 |
| 42 | AO2 | 1.44 |
| 43C | AO1 + 1000 ppm LS2 | 4.06 |
| 44 | AO2 + 1000 ppm LS2 | 1.43 |

Examples 41-44 illustrate that reduced hindrance phenol antioxidants are generally superior to more highly hindered phenol antioxidants for stabilizing polypropylene when used in combination with phosphites of the formulas I and III.

Examples 45-49

Examples 45-49 illustrate the use of stabilizers containing compounds of the formulas I, III, and IV to stabilize polymers in rotational molding applications. Exxon LL8400 grade of LLDPE is dry blended with approximately 350 ppm of zinc stearate, an antioxidant, and light stabilizers as shown in TABLES 14 and 15 below. The dry blend is extruded using a single screw extruder with a melt temperature of approximately 190° C. and ground to a fine powder of approximately 35 mesh. About 1.5 kg aliquot of the powdered resin is then placed in an approximately 1 ft×1 ft×1 ft mold which is rotated three dimensionally while heated in an oven at about 315° C. for about 13 or 15 minutes. After heating for the specified time, the mold is removed from the oven and cooled. The hollow molded cube is then removed from the mold. Cutouts are taken from all faces of the cube and the color of each is measured on the outer and inner cube surfaces (TABLES 14 and 15).

These materials are further tested for impact strength. Following the above outlined procedure, cutouts of approximately 5 inches×5 inches are taken from all faces of the cube and these are tested for low temperature (−40° C.) impact strength according to the Association of Rotational Molders protocol (ASTM D3029) after approximately 13 and 15 minute cure times (TABLE 16).

TABLE 14

(13 Minute Oven Cure Time)

| No. | Composition | YI (inner wall) | YI (outer wall) |
|---|---|---|---|
| 45C | 350 ppm AO3<br>1000 ppm P1 | 3.6 | 3.0 |

TABLE 14-continued (13 Minute Oven Cure Time)

| No. | Composition | YI (inner wall) | YI (outer wall) |
|---|---|---|---|
| 46C | 1365 ppm LS4<br>200 ppm LS2<br>350 ppm AO3<br>500 ppm P2<br>1090 ppm of LS1<br>110 ppm of LS2 | 5.7 | 4.5 |
| 47 | 245 ppm AO2<br>435 ppm P1<br>120 ppm P2<br>1090 ppm of LS1<br>110 ppm of LS2 | 0.7 | 0.5 |

TABLE 15

(15 Minute Oven Cure Time)

| No. | Composition | YI (inner wall) | YI (outer wall) |
|---|---|---|---|
| 48C | 350 ppm AO3<br>1000 ppm P1<br>1365 ppm LS4<br>200 ppm LS2 | 9.3 | 7.9 |
| 49 | 245 ppm AO2<br>435 ppm P1<br>120 ppm P2<br>1090 ppm of LS1<br>110 ppm of LS2 | 4.4 | 3.4 |

TABLE 16

| No. | Composition | Impact Strength<br>13 min cure time | Impact Strength<br>15 min cure time |
|---|---|---|---|
| 50C | 350 ppm AO3<br>1000 ppm P1<br>1365 ppm LS4<br>200 ppm LS2 | 48 ft-lbs | <8 ft-lbs |
| 51 | 245 ppm AO2<br>435 ppm P1<br>120 ppm P2<br>1090 ppm of LS1<br>110 ppm of LS2 | 44 ft-lbs | 44 ft-lbs |

Examples 52-80 below illustrate methods of making stabilizer compositions suitable for incorporation into polyolefins and other polymers.

Examples 52-55

In Examples 52-55, P1, P2, and AO2, in the approximate amounts shown in TABLE 17 below, are dry blended to provide a stabilizer composition in the form of a free flowing additive blend having the relative weight percentages given in TABLE 18, suitable for dosing into polyolefins and other polymers.

TABLE 17

| No. | AO2 (grams) | P1 (grams) | P2 (grams) | P1/P2 (wt. ratio) |
|---|---|---|---|---|
| 52 | 245 | 435 | 120 | 78/22 |
| 53 | 250 | 525 | 75 | 87.5/12.5 |
| 54 | 250 | 400 | 200 | 67/33 |
| 55 | 250 | 350 | 250 | 58/42 |

TABLE 18

| | No. | | | | | | | |
|---|---|---|---|---|---|---|---|---|
| | 52 | | 53 | | 54 | | 55 | |
| | wt. (g) | wt % | wt. (g) | wt % | wt. (g) | wt % | wt. (g) | wt % |
| HALS | 0 | 0.00 | 0 | 0.00 | 0 | 0.00 | 0 | 0.00 |
| UVA | 0 | 0.00 | 0 | 0.00 | 0 | 0.00 | 0 | 0.00 |
| AO | 245 | 30.63 | 250 | 29.41 | 250 | 29.41 | 250 | 29.41 |
| P1 | 435 | 54.38 | 525 | 61.76 | 400 | 47.06 | 350 | 41.18 |
| P2 | 120 | 15.00 | 75 | 8.82 | 200 | 23.53 | 250 | 29.41 |
| Other | 0 | 0.00 | 0 | 0.00 | 0 | 0.00 | 0 | 0.00 |
| Total | 800 | | 850 | | 850 | | 850 | |

Examples 56-59

P1, P2, and AO2, in the approximate amounts shown in TABLE 19 below, are measured into a ribbon blender and then mixed to form a substantially homogeneous powder composition. The relative weight percentages of the components of the resulting stabilizer composition are given in TABLE 20. This powder composition is then compacted to provide a stabilizer composition in the form of a granular additive composition suitable for incorporation into polyolefins and other polymers.

TABLE 19

| No. | AO2 (kg) | P1 (kg) | P2 (kg) | P1/P2 (wt. ratio) |
|---|---|---|---|---|
| 56 | 245 | 435 | 120 | 78/22 |
| 57 | 250 | 525 | 75 | 87.5/12.5 |
| 58 | 250 | 400 | 200 | 67/33 |
| 59 | 250 | 350 | 250 | 58/42 |

TABLE 20

| | No. | | | | | | | |
|---|---|---|---|---|---|---|---|---|
| | 56 | | 57 | | 58 | | 59 | |
| | wt. (g) | wt % | wt. (g) | wt % | wt. (g) | wt % | wt. (g) | wt % |
| HALS | 0 | 0.00 | 0 | 0.00 | 0 | 0.00 | 0 | 0.00 |
| UVA | 0 | 0.00 | 0 | 0.00 | 0 | 0.00 | 0 | 0.00 |
| AO | 245 | 30.63 | 250 | 29.41 | 250 | 29.41 | 250 | 29.41 |
| P1 | 435 | 54.38 | 525 | 61.76 | 400 | 47.06 | 350 | 41.18 |
| P2 | 120 | 15.00 | 75 | 8.82 | 200 | 23.53 | 250 | 29.41 |
| Other | 0 | 0.00 | 0 | 0.00 | 0 | 0.00 | 0 | 0.00 |
| Total | 800 | | 850 | | 850 | | 850 | |

Examples 60-63

Approximately 1000 kg of LS1 and approximately 110 kg of LS2 are combined with P1, P2, and AO2 in approximately the amounts specified in TABLE 21 below. These components are added into a ribbon blender and mixed to form a substantially homogeneous powder blend. The relative weight percentages of components of the resulting stabilizer composition are given in TABLE 22 below. This powder blend is then compacted to afford a stabilizer composition in the form of a granular additive blend suitable for dosing into polyolefins and other polymers.

TABLE 21

| No. | AO2 (kg) | P1 (kg) | P2 (kg) | P1/P2 (wt. ratio) |
|---|---|---|---|---|
| 60 | 245 | 435 | 120 | 78/22 |
| 61 | 250 | 525 | 75 | 87.5/12.5 |
| 62 | 250 | 400 | 200 | 67/33 |
| 63 | 250 | 350 | 250 | 58/42 |

TABLE 22

| | No. | | | | | | | |
|---|---|---|---|---|---|---|---|---|
| | 60 | | 61 | | 62 | | 63 | |
| | wt. (g) | wt % | wt. (g) | wt % | wt. (g) | wt % | wt. (g) | wt % |
| LS1 | 1000 | 52.36 | 1000 | 51.02 | 1000 | 51.02 | 1000 | 51.02 |
| LS2 | 110 | 5.76 | 110 | 5.61 | 110 | 5.61 | 110 | 5.61 |
| AO | 245 | 12.83 | 250 | 12.76 | 250 | 12.76 | 250 | 12.76 |
| P1 | 435 | 22.77 | 525 | 26.79 | 400 | 20.41 | 350 | 17.86 |
| P2 | 120 | 6.28 | 75 | 3.83 | 200 | 10.20 | 250 | 12.76 |
| Other | 0 | 0.00 | 0 | 0.00 | 0 | 0.00 | 0 | 0.00 |
| Total | 1910 | | 1960 | | 1960 | | 1960 | |

Examples 64-67

About 350 g of zinc stearate, about 1000 kg of LS1, and about 110 kg of LS2 are combined with P1, P2, and AO2 in about the amounts specified in TABLE 23 below. These components are added into a ribbon blender and mixed to form a substantially homogeneous powder composition. The relative weight percentages of components of the resulting stabilizer composition are given in TABLE 24 below. This powder composition is then compacted to provide a stabilizer composition in the form of a granular composition suitable for dosing into polyolefins and other polymers.

TABLE 23

| No. | AO2 (kg) | P1 (kg) | P2 (kg) | P1/P2 (wt. ratio) |
|---|---|---|---|---|
| 64 | 245 | 435 | 120 | 78/22 |
| 65 | 250 | 525 | 75 | 87.5/12.5 |
| 66 | 250 | 400 | 200 | 67/33 |
| 67 | 250 | 350 | 250 | 58/42 |

TABLE 24

| | No. | | | | | | | |
|---|---|---|---|---|---|---|---|---|
| | 64 | | 65 | | 66 | | 67 | |
| | wt. (g) | wt % | wt. (g) | wt % | wt. (g) | wt % | wt. (g) | wt % |
| LS1 | 1000 | 44.25 | 1000 | 43.29 | 1000 | 43.29 | 1000 | 43.29 |
| LS2 | 110 | 4.87 | 110 | 4.76 | 110 | 4.76 | 110 | 4.76 |
| AO | 245 | 10.84 | 250 | 10.82 | 250 | 10.82 | 250 | 10.82 |
| P1 | 435 | 19.25 | 525 | 22.73 | 400 | 17.32 | 350 | 15.15 |
| P2 | 120 | 5.31 | 75 | 3.25 | 200 | 8.66 | 250 | 10.82 |
| Other | 350 | 15.49 | 350 | 15.15 | 350 | 15.15 | 350 | 15.15 |
| Total | 2260 | | 2310 | | 2310 | | 2310 | |

Examples 68-70

Approximately 450 grams of P1 (75% of total phosphite) and approximately 150 g of P2 (25% of total phosphite) are intermixed with approximately 250 g of an antioxidant as specified in TABLE 25 below. The relative weight percentages of components of the resulting stabilizer composition are given in TABLE 26 below. Each composition is dry blended to afford a stabilizer composition in the form of a free flowing additive blend suitable for dosing into polyolefins and other polymers.

TABLE 25

| No. | Antioxidant |
|---|---|
| 68 | AO2 |
| 69 | AO4 |
| 70 | Octadecyl 3-(3'-t-butyl-4'-hydroxy-5'-methylphenyl)propionate |

TABLE 26

| | No. 68-70 | |
|---|---|---|
| | wt. (g) | wt % |
| HALS | 0 | 0.00 |
| UVA | 0 | 0.00 |
| AO | 250 | 29.41 |
| P1 | 450 | 52.94 |
| P2 | 150 | 17.65 |
| Other | 0 | 0.00 |
| Total | 850 | |

Examples 71-75

About 450 grams of P1 (75% of total phosphite) and about 150 g of P2 (25% of total phosphite) are combined with varying amounts of AO2 of about the weights specified in TABLE 27 below. The relative weight percentages of the components of the stabilizer composition are given in TABLE 28 below. Each composition is dry blended to afford a stabilizer composition in the form of a free flowing additive composition suitable for compaction or dosing directly into a polyolefin or other polymer.

TABLE 27

| No. | Grams of AO2 | Ratio of total phosphite to phenol |
|---|---|---|
| 71 | 60 | 10:1 |
| 72 | 200 | 3:1 |
| 73 | 600 | 1:1 |
| 74 | 1200 | 1:2 |
| 75 | 1800 | 1:3 |

TABLE 28

| | No. | | | | | | | | | |
|---|---|---|---|---|---|---|---|---|---|---|
| | 71 | | 72 | | 73 | | 74 | | 75 | |
| | wt. (g) | wt % | wt. (g) | wt % | wt. (g) | wt % | wt. (g) | wt % | wt. (g) | wt % |
| HALS | 0 | 0.00 | 0 | 0.00 | 0 | 0.00 | 0 | 0.00 | 0 | 0.00 |
| UVA | 0 | 0.00 | 0 | 0.00 | 0 | 0.00 | 0 | 0.00 | 0 | 0.00 |
| AO | 60 | 9.09 | 200 | 25.00 | 600 | 50.00 | 1200 | 66.67 | 1800 | 75.00 |
| P1 | 450 | 68.18 | 450 | 26.25 | 450 | 37.50 | 450 | 25.00 | 150 | 18.75 |
| P2 | 150 | 22.73 | 150 | 18.75 | 150 | 125.00 | 150 | 8.33 | 150 | 6.25 |
| Other | 0 | 0.00 | 350 | 0.00 | 0 | 0.00 | 0 | 0.00 | 0 | 0.00 |
| Total | 660 | | 800 | | 1200 | | 1800 | | 2400 | |

Examples 76-80

Approximately 1000 g of polyethylene is blended with varying amounts of approximately the weight of the stabilizer composition described in Example 71. The relative weight percentages of the components of the stabilizer composition are given in TABLE 29 below. The compositions are compounded using a single screw extruder and pelletized to give stabilized polyethylene pellets containing ppm levels of additives as specified in TABLE 29 below.

TABLE 29

| No. | Stabilizer Composition (Example 71, g) | Concentration of P1/P2/AO2 (ppm) |
|---|---|---|
| 76 | 0.5 | 281/94/125 |
| 77 | 1.5 | 843/281/375 |
| 78 | 3 | 1686/562/750 |
| 79 | 6 | 3372/1124/1500 |
| 80 | 12 | 6744/2248/3000 |

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A stabilizer composition, comprising:
   (a) a hindered arylalkyl phosphite of the formula (II),

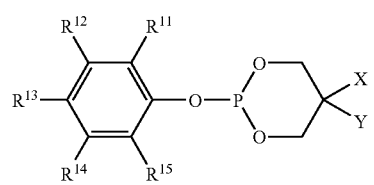

(II)

wherein $R^{11}$ and $R^{15}$ together comprise at least 5 carbons and at least one of $R^{11}$ and $R^{15}$ comprises a tertiary carbon;

wherein $R^{11}$, $R^{12}$, $R^{13}$, $R^{14}$, $R^{15}$, X and Y are each individually selected from hydrogen, $C_1$-$C_{12}$ alkyl, $C_3$-$C_{12}$ cycloalkyl, $C_4$-$C_{12}$ alkyl cycloalkyl, $C_6$-$C_{10}$ aryl, and $C_7$-$C_{12}$ alkylaryl;

(b) a trisarylphosphite of the formula (III),

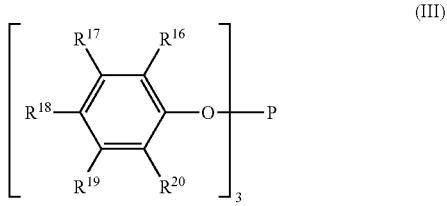

(III)

wherein $R^{16}$, $R^{17}$, $R^{18}$, $R^{19}$, and $R^{20}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl; and (c) a hindered phenol comprising a molecular fragment selected from formulas (IVa), (IVb) and (IVc),

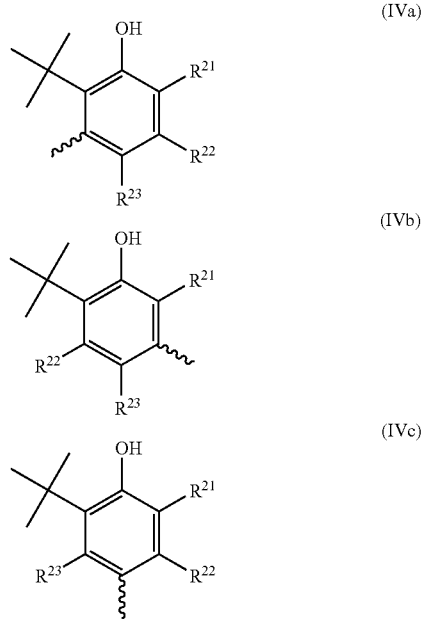

wherein $R^{21}$ is selected from hydrogen and $C_{1-3}$ alkyl; and wherein $R^{22}$ and $R^{23}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl.

2. The stabilizer composition of claim 1, wherein $R^{21}$ is methyl.

3. The stabilizer composition of claim 1, wherein the weight ratio of the hindered arylalkyl phosphite to the trisarylphosphite is less than 1:1.

4. The stabilizer composition of claim 1, wherein the weight ratio of the hindered arylalkyl phosphite to the trisarylphosphite is in the range of from about 1:15 to about 4:5.

5. The stabilizer composition of claim 1, wherein the weight ratio of the hindered arylalkyl phosphite to the trisarylphosphite is in the range of from about 1:10 to about 2:3.

6. The stabilizer composition of claim 1, wherein the hindered arylalkyl phosphite is selected from 2-butyl-2-ethyl-1,3-propanediol 2,4,6-tri-t-butylphenol phosphite, 2-butyl-2-ethyl-1,3-propanediol 2,4-di-cumylphenol phosphite, and 2-butyl-2-ethyl-1,3-propanediol 4-methyl-2,6-di-t-butylphenol phosphite.

7. The stabilizer composition of claim 1, wherein the trisarylphosphite is selected from tris-(2,4-di-t-butylphenyl) phosphite, tris(4-nonylphenyl) phosphite and triphenyl phosphite.

8. The stabilizer composition of claim 1, wherein the hindered phenol is selected from (1,3,5-Tris(4-t-butyl-3-hydroxy-2,6-dimethylbenzyl)-1,3,5-triazine-2,4,6-(1H,3H, 5H)-trione, 1,1,3-Tris(2'-methyl-4'-hydroxy-5'-t-butylphenyl)butane, Triethylene glycol bis[3-(3-t-butyl-4-hydroxy-5-methylphenyl)propionate], 4,4'-Thiobis(2-t-butyl-5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene(3-t-butyl-4-hydroxy-5-methylhydrocinnamate)methane, N,N'-Hexamethylene bis[3-(3-t-butyl-4-hydroxy-5-methylphenyl)propionamide], and Di(4-tertiary-butyl-3-hydroxy-2,6-dimethyl benzyl) thiodipropionate.

9. A polymer composition, comprising a polymer and a stabilizing amount of the stabilizer composition of claim 1.

10. The polymer composition of claim 9, wherein the polymer comprises a polyolefin.

11. The polymer composition of claim 9, wherein the stabilizing amount of the stabilizer composition is in the range of from about 0.01% to about 1.0%, by weight based on the total weight of the polymer composition.

12. The polymer composition of claim 9, wherein the amount of the hindered arylalkyl phosphite in the polymer composition is less than the amount of the trisarylphosphite on a weight basis.

13. The polymer composition of claim 9, wherein the hindered arylalkyl phosphite and the trisarylphosphite are together present in a total phosphite amount in the range of about 0.01 wt. % to about 1.0 wt %, based on total polymer composition weight.

14. The polymer composition of claim 9, wherein the hindered arylalkyl phosphite and the trisarylphosphite are together present in a total phosphite amount in the range of about 0.02 wt. % to about 0.5 wt %, based on total polymer composition weight.

15. The polymer composition of claim 9, wherein the stabilizing amount of the stabilizer composition is an amount that is effective to reduce yellowing of the polymer.

16. The polymer composition of claim 9, wherein the hindered arylalkyl phosphite is selected from 2-butyl-2-ethyl-1,3-propanediol 2,4,6-tri-t-butylphenol phosphite, 2-butyl-2-ethyl-1,3-propanediol 2,4-di-cumylphenol phosphite, and 2-butyl-2-ethyl-1,3-propanediol 4-methyl-2,6-di-t-butylphenol phosphite.

17. The polymer composition of claim 9, wherein the trisarylphosphite is selected from tris-(2,4-di-t-butylphenyl) phosphite, tris(4-nonylphenyl phosphite and triphenyl phosphite.

18. The polymer composition of claim 9, wherein the hindered phenol is selected from (1,3,5-Tris(4-t-butyl-3-hydroxy-2,6-dimethylbenzyl)-1,3,5-triazine -2,4,6-(1H,3H, 5H)-trione, 1,1,3-Tris(2'-methyl-4'-hydroxy-5'-t-butylphenyl)butane, Triethylene glycol bis[3-(3-t-butyl-4-hydroxy-5-methylphenyl)propionate], 4,4'-Thiobis(2-t-butyl -5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene (3-t-butyl-4-hydroxy-5-methylhydrocinnamate)methane, N,N'-Hexamethylene bis[3-(3-t-butyl-4-hydroxy-5-methylphenyl)propionamide], and Di(4-tertiarybutyl-3-hydroxy-2,6-dimethyl benzyl)thiodipropionate.

19. The polymer composition of claim 9, further comprising a light stabilizer selected from a hindered amine light stabilizer, a hindered hydroxyl benzoate, a nickel phenolate, and an ultraviolet light absorber.

20. The polymer composition of claim 19, wherein the light stabilizer is a hindered amine light stabilizer.

21. The polymer composition of claim 20, wherein the hindered amine light stabilizer comprises a molecular fragment of the formula (V),

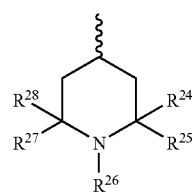

wherein $R^{24}$, $R^{25}$, $R^{26}$, and $R^{27}$ are each individually selected from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl; and wherein $R^{28}$ is selected from hydrogen, $C_1$-$C_{20}$ alkyl, $C_1$-$C_{20}$ acyl and $C_1$-$C_{20}$ alkoxyl.

22. The polymer composition of claim 20, wherein the hindered amine light stabilizer is selected from bis(2,2,6,6-tetramethylpiperidin-4-yl)sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl)n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl)nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines and a reaction product of 7,7,9,9-tetramethyl-2-cycloundecyl-1-oxa-3,8-diaza-4-oxospiro [4.5]decane and epichlorohydrin.

23. The polymer composition of claim 20, further comprising an ultraviolet light absorber.

24. The polymer composition of claim 19, wherein the light stabilizer is an ultraviolet light absorber.

25. The polymer composition of claim 23, wherein the ultraviolet light absorber is selected from a 2-hydroxybenzophenone, a 2-(2'-hydroxyphenyl)benzotriazole, and a 2-(2'-hydroxyphenyl)-1,3,5-triazine.

26. The polymer composition of claim 25, wherein the 2-(2'-hydroxyphenyl)-1,3,5-triazine is of the formula (VI),

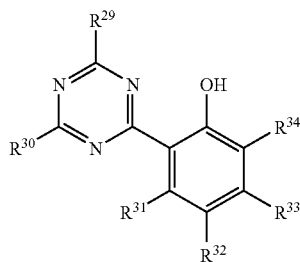

wherein $R^{29}$ and $R^{30}$ are each individually selected from $C_6$-$C_{10}$ aryl, $C_1$-$C_{10}$ alkyl-substituted amino, $C_1$-$C_{10}$ acyl and $C_1$-$C_{10}$ alkoxyl; and $R^{31}$, $R^{32}$, $R^{33}$ and $R^{34}$ are each individually selected from hydrogen, hydroxyl, $C_1$-$C_{10}$ alkyl, $C_1$-$C_{10}$ alkoxyl, $C_1$-$C_{10}$ acyl, $C_3$-$C_{12}$ cycloalkyl, $C_4$-$C_{12}$ alkyl cycloalkyl, $C_6$-$C_{10}$ aryl, and $C_7$-$C_{12}$ alkylaryl.

27. A polymer composition, comprising:
a polyolefin;
a polyolefin-stabilizing amount of a hindered arylalkyl phosphite selected from 2-butyl-2-ethyl-1,3-propanediol 2,4,6-tri-t-butylphenol phosphite, 2-butyl-2-ethyl-1,3-propanediol 2,4-di-cumylphenol phosphite, and 2-butyl-2-ethyl-1,3-propanediol 4-methyl-2,6-di-t-butylphenol phosphite;
a polyolefin-stabilizing amount of a trisarylphosphite selected from tris-(2,4-di-t-butylphenyl) phosphite, tris (4-nonylphenyl phosphite and triphenyl phosphite; and
a polyolefin-stabilizing amount of a hindered phenol selected from (1,3,5-Tris(4-t-butyl-3-hydroxy-2,6-dimethylbenzyl)-1,3,5-triazine-2,4,6-(1H,3H,5H)-trione, 1,1,3-Tris(2'-methyl-4'-hydroxy-5'-t-butylphenyl)butane, Triethylene glycol bis[3-(3-t-butyl-4-hydroxy-5-methylphenyl)propionate], 4,4'-Thiobis(2-t-butyl-5-methylphenol), 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate, Tetrakismethylene(3-t-butyl-4-hydroxy-5-methylhydrocinnamate)methane, N,N'-Hexamethylene bis[3-(3-t-butyl-4-hydroxy-5-methylphenyl)propionamide], and Di(4-tertiarybutyl-3-hydroxy-2,6-dimethyl benzyl) thiodipropionate.

28. A process for making a stabilized polymer composition, comprising mixing a polymer with a stabilizing amount of the stabilizer composition of claim 1.

29. The process of claim 28, wherein the polymer comprises a polyolefin.

30. The process of claim 29, comprising forming the stabilizer composition in the presence of the polymer.

31. The process of claim 30, wherein the mixing comprises at least one selected from extruding, pelletizing and molding.

32. The process of claim 31, wherein the molding comprises at least one selected from blow molding, injection molding and rotational molding.

33. The process of claim 28, further comprising mixing the polymer and the stabilizer composition with a light-stabilizing amount of a hindered amine light stabilizer.

34. The process of claim 32, further comprising mixing the polymer and the stabilizer composition with a light-stabilizing amount of an ultraviolet light absorber selected from a 2-hydroxybenzophenone, a 2-(2'-hydroxyphenyl)benzotriazole, and a 2-(2'-hydroxyphenyl)-1,3,5-triazine.

* * * * *

UNITED STATES PATENT AND TRADEMARK OFFICE
CERTIFICATE OF CORRECTION

| | | |
|---|---|---|
| PATENT NO. | : 7,759,417 B2 | Page 1 of 1 |
| APPLICATION NO. | : 12/300686 | |
| DATED | : July 20, 2010 | |
| INVENTOR(S) | : John Mathew Zenner et al. | |

It is certified that error appears in the above-identified patent and that said Letters Patent is hereby corrected as shown below:

Column 29, line 3, claim 30, "claim 29," should read --claim 28,--.

Signed and Sealed this
Twenty-second Day of March, 2011

David J. Kappos
*Director of the United States Patent and Trademark Office*